(12) United States Patent
Madugula et al.

(10) Patent No.: US 12,474,835 B2
(45) Date of Patent: Nov. 18, 2025

(54) SELF-SYNCHRONIZING REMOTE MEMORY OPERATIONS IN A MULTIPROCESSOR SYSTEM

(71) Applicant: NVIDIA Corporation, Santa Clara, CA (US)

(72) Inventors: Srinivas Santosh Kumar Madugula, Visakhapatnam (IN); Olivier Giroux, Santa Clara, CA (US); Wishwesh Anil Gandhi, Sunnyvale, CA (US); Michael Allen Parker, San Jose, CA (US); Raghuram L, Bangalore (IN); Ivan Tanasic, San Francisco, CA (US); Manan Patel, San Jose, CA (US); Mark Hummel, Franklin, MA (US); Alexander L. Minkin, Los Altos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 18/768,983

(22) Filed: Jul. 10, 2024

(65) Prior Publication Data

US 2024/0393951 A1 Nov. 28, 2024

Related U.S. Application Data

(63) Continuation of application No. 17/900,808, filed on Aug. 31, 2022, now Pat. No. 12,105,960.

(51) Int. Cl.
*G06F 3/06* (2006.01)
(52) U.S. Cl.
CPC .......... *G06F 3/0611* (2013.01); *G06F 3/0659* (2013.01); *G06F 3/0673* (2013.01)

(58) Field of Classification Search
CPC ..... G06F 3/0611; G06F 3/0659; G06F 3/0673
See application file for complete search history.

(56) References Cited

U.S. PATENT DOCUMENTS 11,171,798 B2 11/2021 Klenk et al.
11,336,476 B2 5/2022 Klenk et al.
(Continued)

OTHER PUBLICATIONS

Notice of Allowance received for U.S. Appl. No. 18/755,097, dated Sep. 10, 2025, 14 pages.

*Primary Examiner* — Tracy A Warren
(74) *Attorney, Agent, or Firm* — Squire Patton Boggs LLP; Sarah Mirza

(57) ABSTRACT

Various embodiments include techniques for performing self-synchronizing remote memory operations in a multiprocessor computing system. During a remote memory operation in the multiprocessor computing system, a source processing unit transmits multiple segments of data to a destination processing. For each segment of data, the source processing unit transmits a remote memory operation to the destination processing unit that includes associated metadata that identifies the memory location of a corresponding synchronization object. The remote memory operation along with the metadata is transmitted as a single unit to the destination processing unit. The destination processing unit splits the operation into the remote memory operation and the memory synchronization operation. As a result, the source processing unit avoids the need to perform a separate memory synchronization operation, thereby reducing interprocessor communications and increasing performance of remote memory operations.

20 Claims, 9 Drawing Sheets

(56) References Cited

U.S. PATENT DOCUMENTS

| | | | |
|---|---|---|---|
| 2003/0041173 A1* | 2/2003 | Hoyle | G06F 9/526 |
| | | | 709/248 |
| 2018/0198731 A1* | 7/2018 | Krauss | H04L 67/1095 |
| 2018/0225208 A1 | 8/2018 | Fukuyama | |
| 2019/0377613 A1* | 12/2019 | Xuefeng | G06F 9/522 |
| 2020/0401461 A1 | 12/2020 | Verrilli | |
| 2021/0117248 A1 | 4/2021 | Wong | |
| 2022/0197719 A1 | 6/2022 | Gurtovoy | |
| 2023/0116156 A1 | 4/2023 | Byun | |
| 2023/0229525 A1 | 7/2023 | Michaud | |

* cited by examiner

SELF-SYNCHRONIZING REMOTE MEMORY OPERATIONS IN A MULTIPROCESSOR SYSTEM

CROSS-REFERENCE TO RELATED APPLICATIONS

This application is a continuation of the co-pending U.S. patent application titled, "SELF-SYNCHRONIZING REMOTE MEMORY OPERATIONS IN A MULTIPROCESSOR SYSTEM," filed on Aug. 31, 2022, and having Ser. No. 17/900,808. The subject matter of this related application is hereby incorporated herein by reference.

BACKGROUND

Field of the Various Embodiments

Various embodiments relate generally to computer system architectures and, more specifically, to self-synchronizing remote memory operations in a multiprocessor system.

Description of the Related Art

A computing system generally includes, among other things, one or more processing units, such as central processing units (CPUs) and/or graphics processing units (GPUs), and one or more memory systems. Processing units execute user mode software applications, which submit and launch compute tasks, executing on one or more compute engines included in the processing units. In operation, processing units load data from the one or more memory systems, perform various arithmetic and logical operations on the data, and store data back to the one or more memory systems.

In a multiprocessor system, certain tasks involve transferring data between different processing units by performing remote memory operations. For example, a first processing unit (source) can transfer a block of data to a second processing unit (destination) by storing the block of data to a memory system associated with the second processing unit. If the block of data is too large to be transferred in a single memory operation, the first processing unit divides the block of data into multiple segments where each segment can be transferred in a single memory operation. The first processing unit issues a series of memory operations, one for each segment, to store the data in the memory system associated with the second processing unit. After issuing the series of memory operations, the first processing unit issues a memory synchronization operation, such as a memory fence, followed by a flag write or a release operation. The memory synchronization operation is a synchronization mechanism that ensures the series of memory operations are visible to all participating threads at a given scope, such as system scope or processor scope.

In response to the memory synchronization operation from a given producer, the second processing unit acknowledges the completion of the synchronization operation after ensuring that all prior memory operations are visible at the relevant scope. The second processing unit transmits an acknowledgement to the first processing unit to indicate that the series of memory operations have completed, and the memory synchronization operation has been resolved. In response to the acknowledgement, the producer of the memory operation notifies the completion of memory synchronization through a synchronization object, such as a flag. If multiple producers are synchronizing on the same a synchronization object, then the synchronization object can be atomically updated. One or more consumer threads in the remote processing unit poll the synchronization object and wait for the synchronization object to a reach a specific value, referred to as a saturation value. The condition of the synchronization object reaching the saturation value indicates the completion of all associated memory operations. Upon detecting that the synchronization object has reached the saturation value, the consumer threads can reliably access the data stored in the memory system by the first processing unit.

One problem with this technique for transferring data between processing units is that processing units in a multiprocessor system are typically connected with one another via a relatively low performance interconnect, such as a network system, a signal bus system, and/or the like. Further, in addition to the series of memory operations to transfer the data, three additional operations are performed across this low performance interconnect: the memory synchronization operation, the acknowledgement, and the atomic operation. The data cannot be reliably loaded by the second processing unit until these three additional operations complete, thereby adding significant latency to the overall remote memory synchronization, especially if the data in these memory operations is relatively small.

One potential solution to this problem is to embed a synchronization object with each memory operation that includes a segment of data. With this potential solution, the first processing unit performs a series of memory operations, where each memory operation includes a segment of data and a synchronization object. The memory operation stores the segment of data and atomically sets the synchronization object. Once the second processing unit has determined that all of the synchronization objects have been set, the second processing unit can reliably load the data. One problem with this approach is that the size of each segment transferred in a memory operation is limited by the maximum data size, as supported by the network and the associated memory subsystem, that can be guaranteed to be atomically visible, i.e., both the segment of data and synchronization object are atomically visible to the consumer threads. to the maximum data allowed for atomic operations. The guarantee of such atomicity is typically limited to minimum of the cache line size, the minimum packet size in the network, or the architectural memory operation size. For example, if the maximum size for atomic visibility is 128 bytes, and the synchronization object is 8 bytes, then the synchronization overhead accounts for an overhead ratio of 8/128. In typical processors, such atomicity is guaranteed only up to an architectural memory operation size, which is typically 4 bytes and/or 8 bytes. This limitation results in significant overhead even with a 1-byte synchronization object. Further, any synchronization object size beyond these values is implementation specific and therefore not portable. Transmitting data in smaller segments is typically less efficient than transmitting data in larger segments. Further, a portion of the payload for each memory operation is reserved for the synchronization object. For example, a 512-byte atomic memory operation that includes an 8-byte synchronization object has a remaining payload of only 504 bytes for data. These inefficiencies can result in decreased performance.

Another potential solution to this problem is to process memory operations via an intermediary network data processor, such as a network interface controller (NIC), situated between the two processing units. The network data processor provides a mechanism for the first processing unit and the second processing unit to precisely define and tag individual memory operations. As a result, the second processing unit can keep track of the completion of the memory operations for a given source-destination pair and update the synchronization object accordingly. One problem with this approach is that network data processors can be expensive in terms of cost, surface area, power consumption, and/or the like. In addition, some network data processors rely either on strict ordering execution of memory operations and/or a memory synchronization operation issued by the source. These requirements can be cumbersome to manage. Further, requiring a memory synchronization operation from the source can lead to reduced performance, as described above.

As the foregoing illustrates, what is needed in the art are more effective techniques for performing remote memory operations in a computing system.

SUMMARY

Various embodiments of the present disclosure set forth a computer-implemented method for performing remote memory operations in a computing system. The method includes merging a first memory store operation and a first synchronization operation to generate a first self-synchronizing memory store operation. The method further includes transmitting the first self-synchronizing memory store operation to a memory system. The method further includes determining that the first self-synchronizing memory store operation has arrived at a point of consistency in a remote computing system. The method further includes dividing, at the point of consistency, the first self-synchronizing memory store operation into the first memory store operation and the first synchronization operation. The method further includes storing data included in the first memory store operation at a first location in the memory system. The method further includes updating a first synchronization object specified by the first synchronization operation, wherein the first synchronization object is stored at a second location in the memory system. The method further includes opportunistically coalescing synchronization operations to the same synchronization object, thereby reducing the number of required updates to the synchronization object and additional memory bandwidth associated with such fine-grained synchronization. The method further includes accommodating systems that partially support self-synchronizing remote memory operations depending on various constraints.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, memory synchronization operations are resolved closer to the destination processing unit, thereby reducing the number of operations performed over the interconnect between processors. As a result, operating performance is increased relative to prior approaches. Another advantage of the disclosed techniques is that the disclosed techniques do not require an expensive and complex network data processor to perform remote memory operations. Instead, the disclosed techniques leverage existing memory operation types and do not rely on any explicit ordering of memory operations, leading to higher efficiency and performance for remote memory operations. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
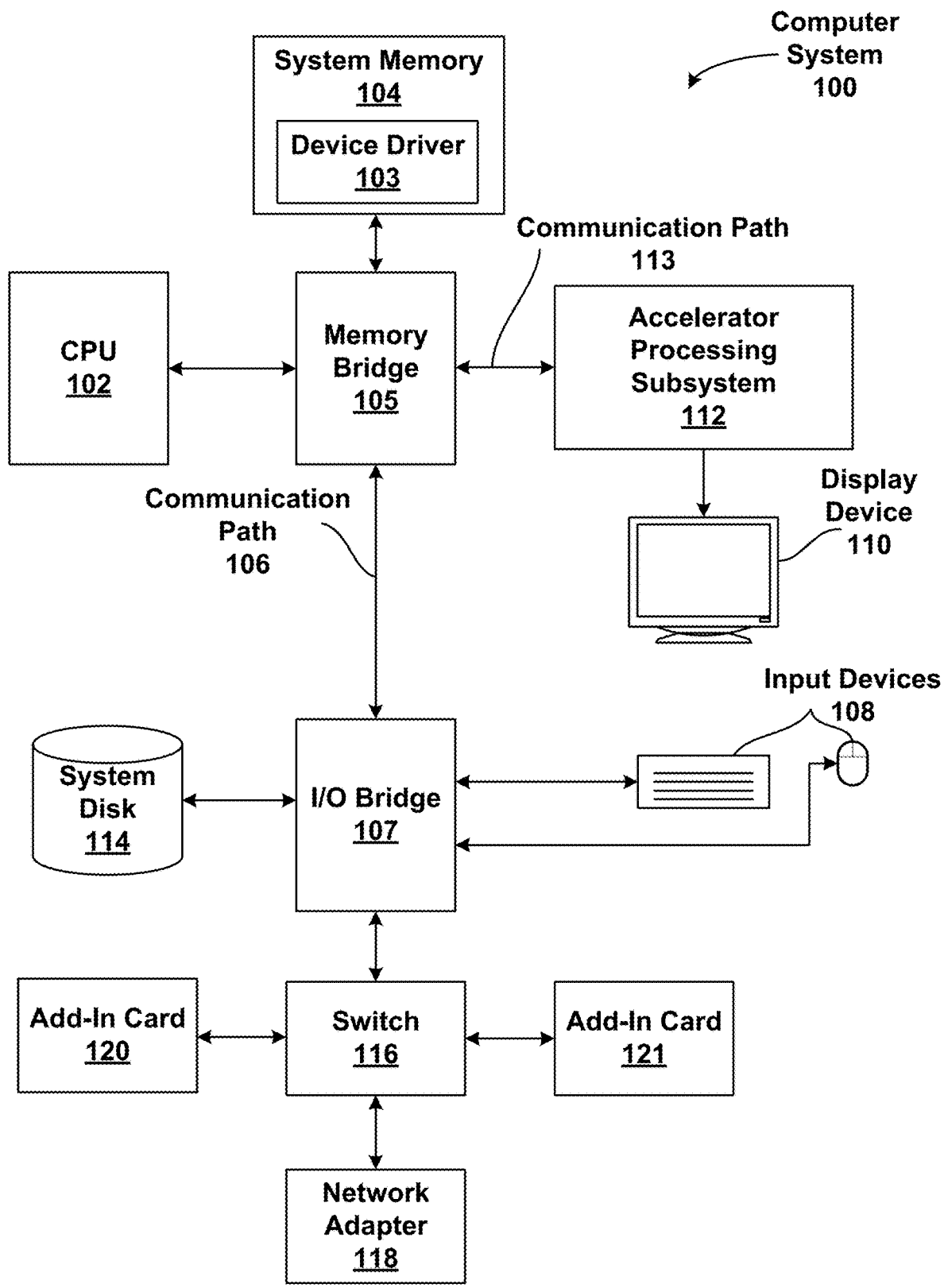
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to an accelerator processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computer system 100 to authorized users and deny access of computer system 100 to unauthorized users. Switch 116 is configured to provide connections between I/O bridge 107 and other components of the computer system 100, such as a network adapter 118 and various add-in cards 120 and 121. In some examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and accelerator processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, Peripheral Component Interconnect Express (PCIe), HyperTransport, or any other bus or point-to-point communication protocol known in the art.

In some embodiments, accelerator processing subsystem 112 comprises a graphics subsystem that delivers pixels to a display device 110 that may be any conventional cathode ray tube, liquid crystal display, light-emitting diode display, or the like. In such embodiments, the accelerator processing subsystem 112 incorporates circuitry optimized for graphics and video processing, including, for example, video output circuitry. As described in greater detail below in FIG. 2, such circuitry may be incorporated across one or more accelerators included within accelerator processing subsystem 112. An accelerator includes any one or more processing units that can execute instructions such as a central processing unit (CPU), a parallel processing unit (PPU) of FIGS. 2-4, a graphics processing unit (GPU), a direct memory access (DMA) unit, an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, accelerator processing subsystem 112 includes two processors, referred to herein as a primary processor (normally a CPU) and a secondary processor. Typically, the primary processor is a CPU and the secondary processor is a GPU. Additionally or alternatively, each of the primary processor and the secondary processor may be any one or more of the types of accelerators disclosed herein, in any technically feasible combination. The secondary processor receives secure commands from the primary processor via a communication path that is not secured. The secondary processor accesses a memory and/or other storage system, such as such as system memory 104, Compute eXpress Link (CXL) memory expanders, memory managed disk storage, on-chip memory, and/or the like. The secondary processor accesses this memory and/or other storage system across an insecure connection. The primary processor and the secondary processor may communicate with one another via a GPU-to-GPU communications channel, such as Nvidia Link (NVLink). Further, the primary processor and the secondary processor may communicate with one another via network adapter 118. In general, the distinction between an insecure communication path and a secure communication path is application dependent. A particular application program generally considers communications within a die or package to be secure. Communications of unencrypted data over a standard communications channel, such as PCIe, are considered to be unsecure.

In some embodiments, the accelerator processing subsystem 112 incorporates circuitry optimized for general purpose and/or compute processing. Again, such circuitry may be incorporated across one or more accelerators included within accelerator processing subsystem 112 that are configured to perform such general purpose and/or compute operations. In yet other embodiments, the one or more accelerators included within accelerator processing subsystem 112 may be configured to perform graphics processing, general purpose processing, and compute processing operations. System memory 104 includes at least one device driver 103 configured to manage the processing operations of the one or more accelerators within accelerator processing subsystem 112.

In various embodiments, accelerator processing subsystem 112 may be integrated with one or more other the other elements of FIG. 1 to form a single system. For example, accelerator processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of accelerator processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, accelerator processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
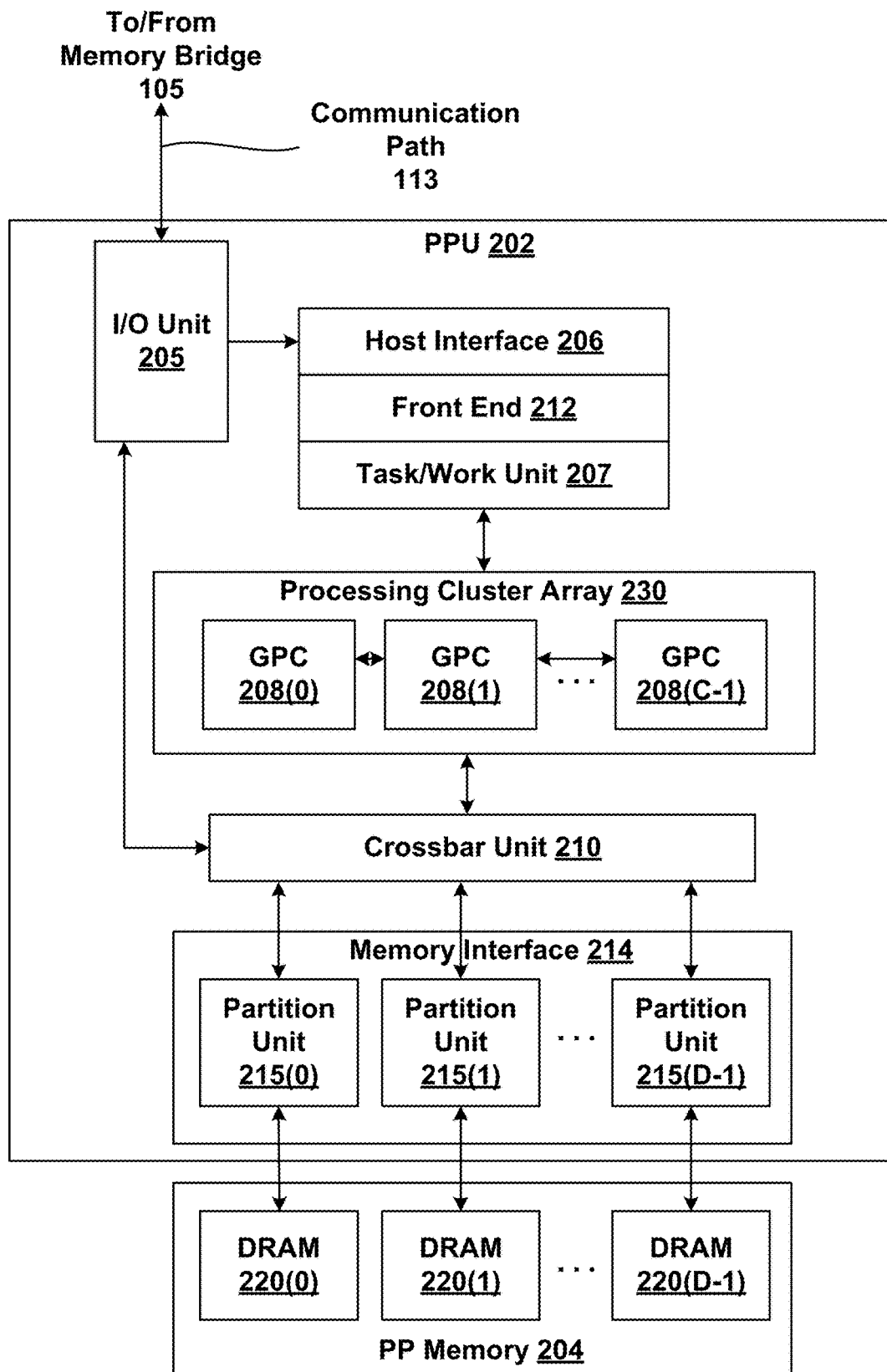
FIG. 2 is a block diagram of a parallel processing unit (PPU) included in the accelerator processing subsystem of FIG. 1, according to various embodiments.

FIG. 2 is a block diagram of a parallel processing unit (PPU) 202 included in the accelerator processing subsystem 112 of FIG. 1, according to various embodiments. Although FIG. 2 depicts one PPU 202, as indicated above, accelerator processing subsystem 112 may include any number of PPUs 202. Further, the PPU 202 of FIG. 2 is one example of an accelerator included in accelerator processing subsystem 112 of FIG. 1. Alternative accelerators include, without limitation, CPUs, GPUs, DMA units, IPUs, NPUs, TPUs, NNPs, DPUs, VPUs, ASICs, FPGAs, and/or the like. The techniques disclosed in FIGS. 2-4 with respect to PPU 202 apply equally to any type of accelerator(s) included within accelerator processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or accelerators other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, accelerator processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within accelerator processing subsystem 112, or another accelerator processing subsystem 112 within computer system 100.

As noted above, any number of PPUs 202 may be included in an accelerator processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
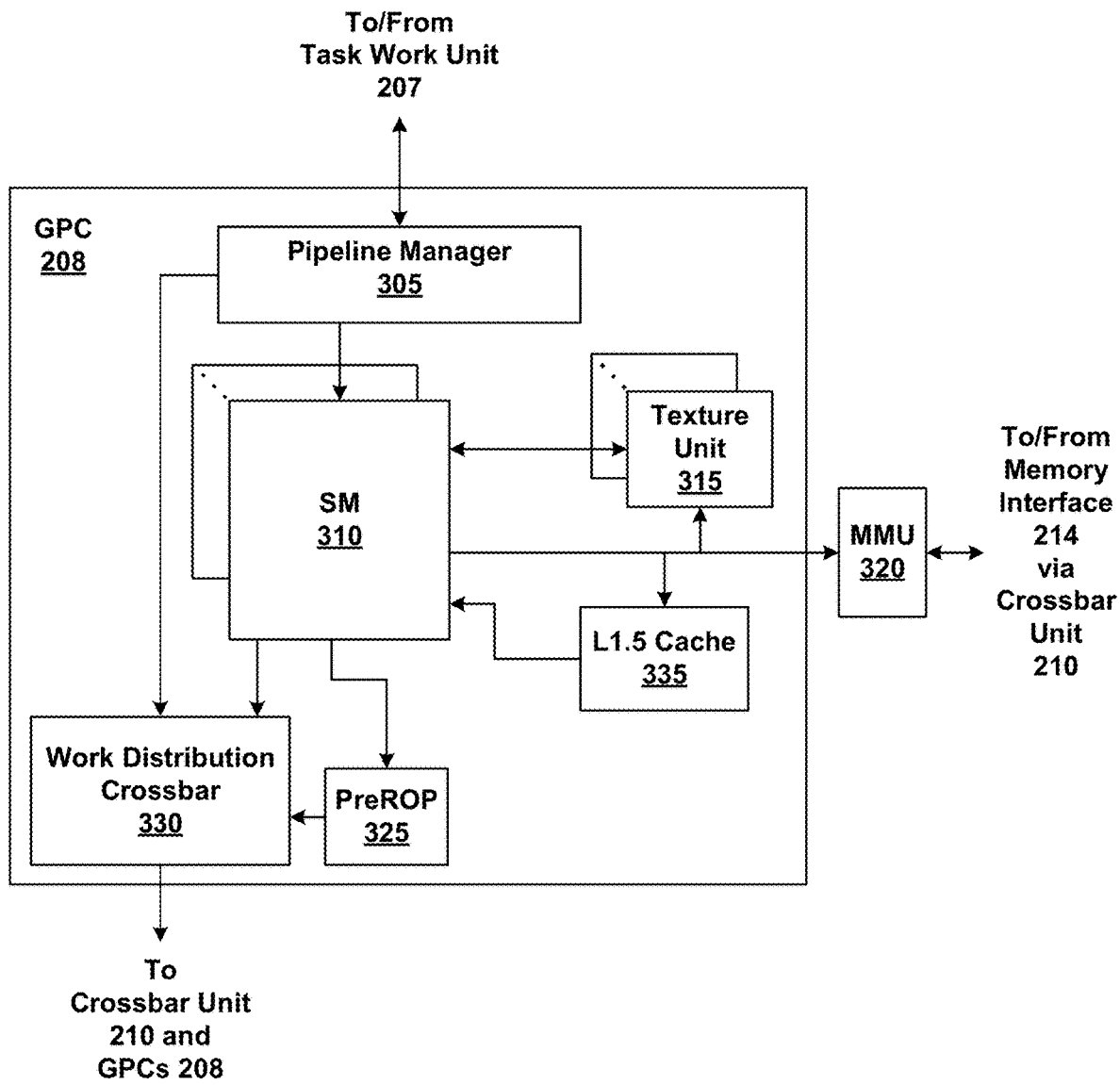
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Self-Synchronizing Remote Memory Operations

Various embodiments include techniques for performing remote memory operations in a multiprocessor system. Processing units in a multiprocessor system perform self-synchronizing remote memory operations, where remote memory operations include the associated metadata that identifies the memory location of the corresponding synchronization object. The remote memory operation along with the metadata is transmitted as a single unit until a point relatively close to the destination, at which point the remote memory operation and the memory synchronization operation diverge. This point is referred to as the point of consistency. At the point of consistency, the remote memory operation and the memory synchronization operation is split into two operations. The memory synchronization operation, which updates the synchronization object, is ordered behind the execution of the remote memory operation. This approach facilitates fine-grained synchronization of remote memory operations with low network latency and network bandwidth overhead. This approach further facilitates coalescing of multiple updates to the same synchronization object across multiple remote memory operations that are temporally collocated. Coalescing of multiple remote memory operations further reduces the overhead of the fine-grained synchronization.

Figure 4:
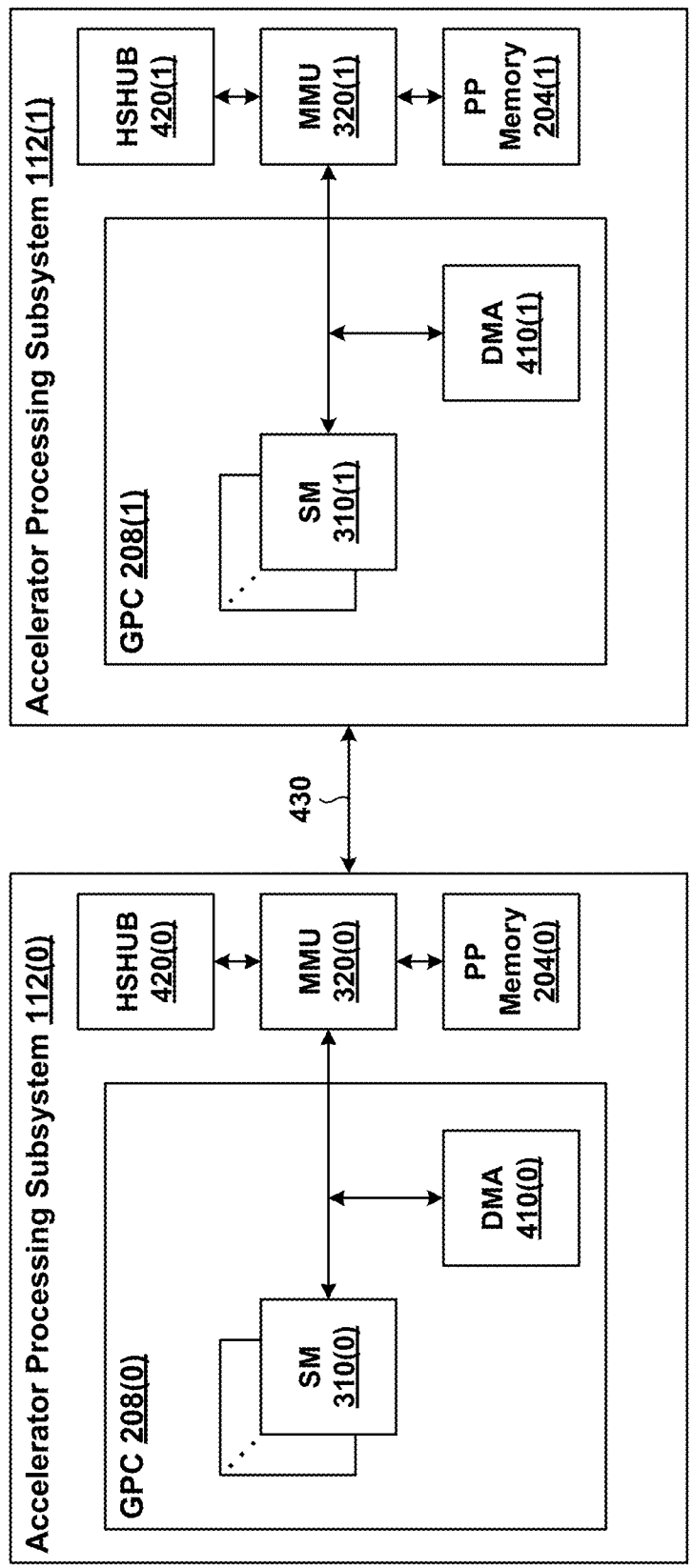
FIG. 4 is a block diagram of accelerator processing subsystems of FIG. 1 configured to perform self-synchronizing remote memory operations, according to various embodiments.

FIG. 4 is a block diagram of accelerator processing subsystems 112 of FIG. 1 configured to perform self-synchronizing remote memory operations, according to various embodiments. As shown, a first accelerator processing subsystem 112(0) includes, without limitation, a GPC 208(0), PP memory 204(0), an MMU 320(0), and a high-speed hub (HSHUB) 420(0). The GPC 208(0) includes, without limitation, SMs 310(0) and a direct memory access (DMA) controller 410(0). Likewise, a second accelerator processing subsystem 112(1) includes, without limitation, a GPC 208(1), PP memory 204(1), an MMU 320(1), and a high-speed hub 420(1). The GPC 208(1) includes, without limitation, SMs 310(1) and a DMA controller 410(1). Although the operation of the first accelerator processing subsystem 112(0) is described below, the second accelerator processing subsystem 112(1) functions essentially the same as the first accelerator processing subsystem 112(0). The first accelerator processing subsystem 112(0) and the second accelerator processing subsystem 112(1) communicate via an interconnect 430. The interconnect can be any suitable inter-processor communications mechanism, such as a, such as a network system, a signal bus system, and/or the like.

In operation, the SMs 310(0) perform various processing operations by means of a set of functional execution units, such as execution units and load-store units. The SMs 310(0) employ the load-store units to load data from the local PP memory 204(0) and from the remote PP memory 204(1). Similarly, the SMs 310(0) employ the load-store units to store data to the local PP memory 204(0) and to the remote PP memory 204(1).

To store data to the remote PP memory 204(1), an SM 310(0) generates a remote memory operation and transmits the remote memory operation to the MMU 320(0). The MMU 320(0) translates virtual addresses included in the remote memory operation to corresponding physical addresses as needed. If the MMU 320(0) determines that the physical addresses correspond to an address space belonging to another accelerator processing subsystem, such as accelerator processing subsystem 112(1), the MMU 320(0) forwards the remote memory operation to the high-speed hub 420(0). The high-speed hub 420(0), in turn, forwards the remote memory operation to the remote high-speed hub 420(1). The high-speed hub 420(1) stores the data included in the remote memory operation in the remote PP memory 204(1). When the remote SM 310(1) determines that the data is ready for loading, the SM 310(1) loads the data stored in the PP memory 204(1).

For large data block transfers, the SM 310(0) can employ the DMA controller 410(0). The SM 310(0) configures the DMA controller 410(0) to transfer the block of data. In so doing, the SM 310(0) can specify the starting virtual address and data block size, the starting virtual address and the ending virtual address, and/or the like. After the SM 310(0) configures the DMA controller 410(0) to transfer the block of data, the DMA controller 410(0) generates multiple remote memory operations, where each remote memory operation transfers a segment of the block of data. The DMA controller 410(0) transmits each remote memory operation to the MMU 320(0). The MMU 320(0) translates virtual addresses included in the remote memory operation to corresponding physical addresses as needed. If the MMU 320(0) determines that the physical addresses correspond to an address space belonging to another accelerator processing subsystem, such as accelerator processing subsystem 112(1), the MMU 320(0) forwards the remote memory operation to the high-speed hub 420(0). The high-speed hub 420(0), in turn, forwards the remote memory operation to the remote high-speed hub 420(1). The high-speed hub 420(1) stores the data segment included in the remote memory operation in the remote PP memory 204(1). When the remote SM 310(1) determines that all of the data segments of the block of data are ready for loading, the SM 310(1) loads the data stored in the PP memory 204(1).

A self-synchronizing remote memory operation can be generated by any processing unit, including an SM 310(0), a DMA controller 410(0), and/or the like. To generate a self-synchronizing remote memory operation, the processing unit generates a remote memory operation to store data in a memory system other than local PP memory 204(0). One such memory system is the remote PP memory 204(1) included in the second accelerator processing subsystem 112(1). The processing unit generates a synchronization operation that includes metadata identifying a synchronization object associated with the remote memory operation and a particular memory location where the synchronization object is stored. The processing unit merges the remote memory operation and the metadata to generate a self-synchronizing remote memory operation. The processing unit transmits the self-synchronizing remote memory operation to the second accelerator processing subsystem 112(1) as described herein.

The self-synchronizing remote memory operation remains as a merged remote memory operation and synchronization operation until the self-synchronizing remote memory operation reaches a point of consistency. The point of consistency can be at any component included in the second accelerator processing subsystem 112(1) that directs the remote memory operation towards one set of memory locations and the synchronization operation towards a different set of memory locations. In one example, the point of consistency can be the remote high-speed hub 420(1). At the point of consistency, the component, such as the remote high-speed hub 420(1), divides the self-synchronizing remote memory operation into two operations: (1) the remote memory operation that stores the data segment; and (2) the synchronization operation that updates the synchronization object. The component orders the two operations such that the remote memory operation executes prior to the synchronization operation. The remote SM 310(1) polls the synchronization object to determine whether the synchronization object has been updated by the synchronization operation. When the synchronization object is updated, the remote SM 310(1) can reliably load the data stored by the remote memory operation. Because the update of the synchronization is processed at the point of consistency rather than at the first SM 310(0), traffic across the interconnect 430 is reduced, leading to improved remote memory performance.

The synchronization object can be any suitable data structure for synchronizing one or more remote memory operations. If a single remote memory operation is being synchronized, the synchronization object can be a binary flag. The binary flag can be cleared prior to the remote memory operation. After the remote memory operation executes, the synchronization operation sets the binary flag. When the remote SM 310(1) determines that the binary flag is set, the remote SM 310(1) can reliably load the data stored by the remote memory operation.

If multiple remote memory operations are being synchronized, the synchronization object can be a count of the number of bytes being transferred by the multiple remote memory operations. Prior to executing the multiple remote memory operations, the remote SM 310(1) determines the value of the count currently stored in the synchronization object. The remote SM 310(1) adds the number of bytes expected from the multiple remote memory operations to the current count to determine a target count. When the remote SM 310(1) determines that the count stored in the synchronization object is equal to the target count, then the multiple remote memory operations have executed. The remote SM 310(1) can reliably load the data stored by the multiple remote memory operations. In some examples, the count stored in the synchronization object is cleared prior to executing the multiple remote memory operations. In such examples, the target count is equal to the number of bytes being transferred by the multiple remote memory operations.

Additionally or alternatively, if multiple remote memory operations are being synchronized, the synchronization object can be a count of the number of data segments being transferred by the multiple remote memory operations. Typically, one data segment is transferred for each remote memory operation. Prior to executing the multiple remote memory operations, the remote SM 310(1) determines the value of the count currently stored in the synchronization object. The remote SM 310(1) adds the number of data segments expected from the multiple remote memory operations to the current count to determine a target count. When the remote SM 310(1) determines that the count stored in the synchronization object is equal to the target count, then the multiple remote memory operations have executed. The remote SM 310(1) can reliably load the data stored by the multiple remote memory operations. In some examples, the count stored in the synchronization object is cleared prior to executing the multiple remote memory operations. In such examples, the target count is equal to the number of data segments being transferred by the multiple remote memory operations.

In some examples, multiple SMs 310 included in the first accelerator processing subsystem 112(0) and/or other accelerator processing subsystems 112 can execute the multiple remote memory operations. In such examples, multiple SMs can execute synchronization operations to update the synchronization object. In one non-limiting example, one or more SMs 310 executing on each of four different accelerator processing subsystems 112 can all contribute to a particular data transfer. Each of the SMs 310 executing on the various accelerator processing subsystems 112 transfer one or more data segments included the data transfer. Each of the SMs 310 can transfer any number of data segments of any size. Each of the SMs 310 perform one or more of the techniques described herein to merge memory store operation(s) with corresponding synchronization operation(s) to generate one or more self-synchronizing memory store operation(s). When the remote SM 310(1) determines that the count stored in the synchronization object is equal to the target count, then the multiple remote memory operations from the various SMs 310 have executed. The remote SM 310(1) can reliably load the data stored by the multiple remote memory operations executed by the multiple SMs 310.

In some examples, multiple SMs 310 included in the second accelerator processing subsystem 112(0) and/or other accelerator processing subsystems 112 can receive the data from one or more related remote memory operations. In such examples, multiple SMs can poll the same synchronization object to determine when the remote memory operations are complete. In one non-limiting example, one or more SMs 310 executing on each of four different accelerator processing subsystems 112 can all be configured to receive data from a particular data transfer. Each of the SMs 310 executing on the various accelerator processing subsystems 112 poll the synchronization object to determine when the data segments included the data transfer have been received. Each of the SMs 310 can independently determine when the data transfer is complete and, in response, read any or all of the data included in the data transfer. Each of the SMs 310 perform one or more of the techniques described herein to divide, at respective points of consistency, self-synchronizing memory store operation(s) into corresponding memory store operation(s) and synchronization operation(s). As each remote SM 310 determines that the count stored in the synchronization object is equal to the target count, the remote SM 310 determines that one or more remote memory operations from one or more source SMs 310 have executed. The remote SM 310(1) can reliably load the data stored by the multiple remote memory operation(s) executed by the one or more source SMs 310.

In some examples, multiple SMs 310 can load the data stored by the self-synchronizing remote memory operations. In such examples, multiple SMs 310 can determines when the count stored in the synchronization object is equal to the target value and/or count. Then multiple SMs 310 can reliably load the data stored by the multiple remote memory operations executed by the multiple SMs 310.

In some examples, multiple SMs 310 included in the first accelerator processing subsystem 112(0) and/or other accelerator processing subsystems 112 can execute multiple remote memory operations. In such examples, the synchronization object can also act as a barrier for a given set of participating threads. In such cases, the synchronization data structure includes two components, the thread count and target count. All participating threads arrive at the barrier by incrementing the thread count. Further, the producer threads decrement the target count by the total number of memory operations to be performed by that producer. The producer threads perform self-synchronizing memory operations which increment the target count providing the positive counterpart for the subsequent decrement operation. The consumer threads wait on the barrier for the thread count to be equal to the participating threads and the target count to be equal to zero. Target count being equal to zero implies that all inflight memory operations from all participating producers are visible and the remote SM 310(1) can reliably load the data stored by the multiple remote memory operations executed by the multiple SMs 310.

In some examples, a particular source SM 310 and destination SM 310 pair may not have a mutually defined point of consistency where the self-synchronizing remote memory operation can be divided into a remote memory operation and a synchronizing operation. Such a source SM 310 and destination SM 310 pair is unable to process self-synchronizing remote memory operations. However, other source SM 310 and destination SM 310 pairs may have a mutually defined point of consistency and can process self-synchronizing remote memory operations. In such examples, a source SM 310 generates self-synchronizing remote memory operations with the assumption that the source SM 310 and the destination SM 310 can process the self-synchronizing remote memory operation. If the source SM 310 and destination SM 310 pair cannot process the self-synchronizing remote memory operation, then a component included in the source SM 310 and/or destination SM 310 opportunistically demotes the self-synchronizing remote memory operation to a non-self synchronizing remote memory store operation. The source SM 310 executes a conventional synchronization operation to synchronize the remote memory operation. In this manner, source SM 310 and destination SM 310 pairs take advantage of self-synchronizing remote memory operations where possible. Source SM 310 and destination SM 310 pairs that are unable to take advantage can process the remote memory operations without self-synchronization.

In some examples, the reliable update of the synchronization object can be contingent on detection of a demotion at the source SM 310. Additionally or alternatively, the reliable update of the synchronization object can be mandatory irrespective of whether and when the demotion is detected. In such latter examples, the destination SM 310 can select between the reliable update mechanism, which is assured to succeed or the self-synchronizing update mechanism, which may or may not succeed. If the SM 310 selects the self-synchronizing update mechanism, then a demoted remote memory operation can complete with a synchronization operation executed by the source SM 310. As a result, the count stored in the synchronization object may not reach the target count upon completion of the multiple remote memory operations. In such cases, an SM 310 can "repair" the synchronization object by updating the count to the target count upon completion of the self-synchronizing remote memory operations and the demoted remote memory operations.

In some examples, the source SM 310 can have memory operations directed towards a mix of destinations that support and/or do not support self-synchronizing remote-memory operations. In such cases, any point along the path from source to the destination can determine the lack of support for self-synchronizing operation and demote the memory operation to a normal non-synchronizing remote memory operation. There are at least two possible implementations to process memory operations with such partial self-synchronizing support in the system.

In a first implementation, the synchronization object includes a reliable and an unreliable component. The unreliable component is updated by the self-synchronizing remote operations that are not demoted. The reliable component is also updated by source SM 310 after traditional memory synchronization following a memory fence or a release operation. The destination SM 310 polls on both the reliable component and the unreliable component. If either of the components reach the target count, then the destination SM 310 can reliably read the data. In such implementations, to reuse the synchronization object for the next phase, the unreliable component is "repaired" by one of the participating threads based on the reliable component. Both the reliable component and the unreliable component can be placed in adjacent memory locations for the destination SM 310 to efficiently poll both the locations. Such implementations have the advantage that the source SM 310 is unaware of demotion, which increases applicability and reduce hardware complexity.

In a second implementation, the source SM 310 is notified of such demotion from the point where the demotion occurred by sending a negative acknowledgement (NACK) back to the SM 310. The source SM 310 maintains a record of such demoted operations and updates the synchronization object with demoted operations after performing a memory fence or a release operation. Such implementations simplify the software by maintaining a single reliable count in the synchronization object rather than two counts.

In some examples, the remote memory operation and the synchronization operation included in a self-synchronizing remote memory operation can be restricted to the same physical memory page. As described herein, a self-synchronizing remote memory operation includes a remote memory operation and a synchronization operation. Therefore, the remote memory operation could be directed to a virtual address that resides on one physical memory page and the synchronization operation could be directed to a virtual address that resides on a different virtual memory page. As a result, the MMU 320(0) can be tasked with performing two different virtual address translations for a single self-synchronizing remote memory operation. In cases where the MMU 320(0) is unable to perform two virtual address translations for a single memory operation, self-synchronizing remote memory operations can be restricted to cases where the target of the remote memory operation the target of the synchronization operation reside on the same physical memory page. If the MMU 320(0) determines that a self-synchronizing remote memory operation has a remote memory operation and a synchronization operation that are targeted to different virtual memory pages, the self-synchronizing remote memory operation is demoted to a non-self synchronizing remote memory store operation. As a result, self-synchronizing remote memory operations are restricted to cases where the MMU 320(0) performs only one virtual address translation for a give self-synchronizing remote memory operation. This demotion mechanism can be employed in conjunction with the opportunistic demotion mechanism described above.

In some examples, multiple self-synchronizing remote memory operations can arrive at the point of consistency at approximately the same time. In such cases, the component at the point of consistency can opportunistically coalesce the synchronization operations for multiple self-synchronizing remote memory operations. As a result, the point of consistency can perform a single synchronization operation to update the synchronization object on behalf of two or more self-synchronizing remote memory operations, thereby reducing the update bandwidth for updating the synchronization object. This opportunistic coalescing can be implemented via one or more techniques.

In a first technique, self-synchronizing remote memory operations that include synchronization operations directed towards the same synchronization object can be coalesced over a fixed or variable temporal window or duration of time. Additionally or alternatively, self-synchronizing remote memory operations can be coalesced over a given count of self-synchronizing remote memory operations. Additionally or alternatively, self-synchronizing remote memory operations can be coalesced over a combination of a fixed or variable temporal window or duration of time with a given count of self-synchronizing remote memory operations.

In a second technique, self-synchronizing remote memory operations that include synchronization operations directed towards the same synchronization object can be coalesced while a least one an existing update to the same synchronization object is in flight and/or otherwise pending.

In a third technique, self-synchronizing remote memory operations that include synchronization operations directed towards the same synchronization object can be coalesced based on hints in the form of data received from the source SM 310. These hints can indicate the likely number of forthcoming self-synchronizing remote memory operations directed towards a given synchronization object, a total data size for the forthcoming self-synchronizing remote memory operations directed towards the given synchronization object, and/or the like. The hints can be included in the metadata of the synchronization operations within the self-synchronizing remote memory operations. The hints may be embedded in the application program at compile time, determined by the processing unit at runtime, and/or the like. These opportunistic coalescing techniques can be employed separately or in any technically feasible combination.

It will be appreciated that the system shown herein is illustrative and that variations and modifications are possible. The techniques described herein are in the context of two accelerator processing subsystems 112 configured to perform remote memory operations. Additionally or alternatively, the techniques described herein can be performed by one or more alternative accelerators including, without limitation, CPUs, GPUs, DMA units, IPUs, NPUs, TPUs, NNPs, DPUs, VPUs, ASICs, FPGAS, and/or the like, in any combination. More generally, the techniques described herein can be applied to any CPU 102, PPU 202, and/or any other processing unit in any combination.

Figure 5:
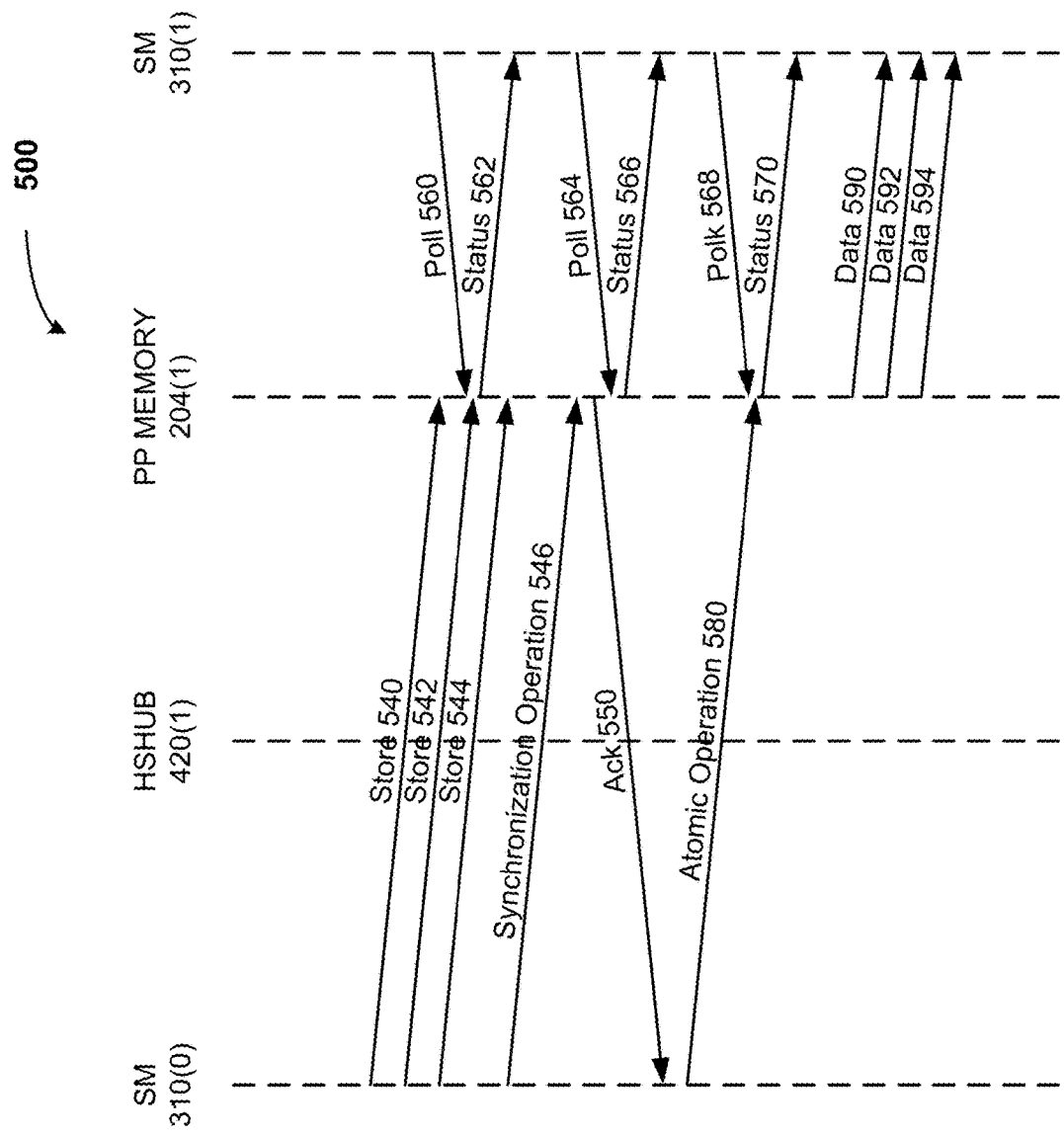
FIG. 5 is a sequence diagram of non-self-synchronizing remote memory operations performed by the accelerator processing subsystems of FIG. 4, according to various embodiments.

FIG. 5 is a sequence diagram 500 of non-self-synchronizing remote memory operations performed by the accelerator processing subsystems 112 of FIG. 4, according to various embodiments. In some examples, a source SM, such as SM 310(0), and a destination SM or remote SM, such as SM 310(1) may not have a mutually defined point of consistency. For example, the remote high-speed hub 420 (1), may not be configured to divide a self-synchronizing remote memory operation into a remote memory operation and a synchronizing operation. Such a source SM 310(0) and destination SM 310(1) pair is unable to process self-synchronizing remote memory operations. If the source SM 310(0) is aware of this limitation a priori, the source SM 310(0) can generate non-self-synchronizing remote memory operations.

As shown, the SM 310(0) generates three store operations 540, 542, and 544 and transmits the three store operations 540, 542, and 544 to the remote high-speed hub 420(1). The remote high-speed hub 420(1) forwards the store operations 540, 542, and 544 to the remote PP memory 204(1). The SM 310(0) generates a memory synchronization operation 546 and transmits the memory synchronization operation 546 to the remote PP memory 204(1) via the remote high-speed hub 420(1). When the remote PP memory 204(1) determines that the three store operations 540, 542, and 544 have completed, and in response to the memory synchronization operation 546, the PP memory 204(1) generates an acknowledgement (Ack) 550. The remote PP memory 204(1) transmits the acknowledgement 550 to the SM 310(0) indicating that the three store operations 540, 542, and 544 have completed. In response, the SM 310(0) generates an atomic operation 580 to set a flag stored in the remote PP memory 204(1).

Meanwhile, the remote SM 310(1) polls the flag to determine whether the three store operations 540, 542, and 544 have completed. The remote SM 310(1) generates a poll 560 and transmits the poll 560 to the remote PP memory 204(1). At the time that the remote PP memory 204(1)

receives the poll 560, the three store operations 540, 542, and 544 have not yet completed. Therefore, the remote PP memory 204(1) returns a status 562 indicating that the data is not yet available for loading. The remote SM 310(1) generates another poll 564 and transmits the poll 564 to the remote PP memory 204(1). At the time that the remote PP memory 204(1) receives the poll 564, the three store operations 540, 542, and 544 have completed and the remote PP memory 204(1) has received the memory synchronization operation 546. The remote PP memory 204(1) has transmitted an acknowledgement 550 to the SM 310(0). However, the remote PP memory 204(1) has not yet received the atomic operation 580 that updates the flag. Therefore, the remote PP memory 204(1) returns a status 566 indicating that the data is not yet available for loading. The remote SM 310(1) generates another poll 568 and transmits the poll 568 to the remote PP memory 204(1). At the time that the remote PP memory 204(1) receives the poll 568, the PP memory 204(1) has received and processed the atomic operation 580 that updates the flag. Therefore, the remote PP memory 204(1) returns a status 570 indicating that the data is available for loading. In response, the remote SM 310(1) performs three data load operations 590, 592, and 594 to load the data stored by the three store operations 540, 542, and 544, respectively.

The remote memory operations illustrated in FIG. 5 reliably transfer data from the SM 310(0) to the remote SM 310(1). However, the memory synchronization operation 546, acknowledgement 550, and atomic operation 580 all transfer over the relatively low performance interconnect 430 between the SM 310(0) and the remote SM 310(1).

Figure 6:
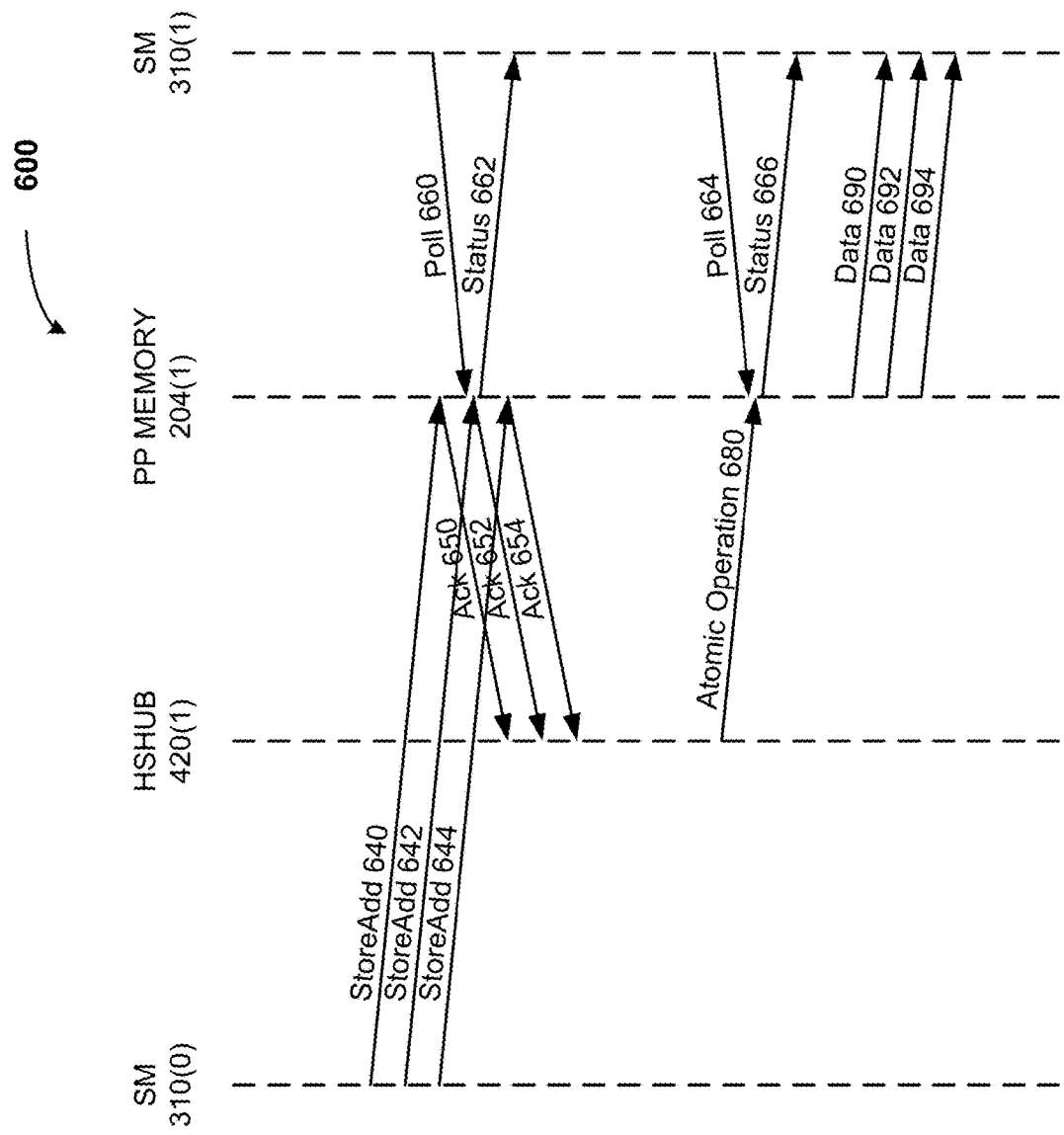
FIG. 6 is a sequence diagram of self-synchronizing remote memory operations performed by the accelerator processing subsystems of FIG. 4, according to various embodiments.

FIG. 6 is a sequence diagram 600 of self-synchronizing remote memory operations performed by the accelerator processing subsystems 112 of FIG. 4, according to various embodiments. In some examples, a source SM, such as SM 310(0), and a destination SM or remote SM, such as SM 310(1) have a mutually defined point of consistency, such as the remote high-speed hub 420(1). Such a source SM 310(0) and destination SM 310(1) pair is able to process self-synchronizing remote memory operations.

As shown, the SM 310(0) generates three self-synchronizing remote memory operations (store/add) operations 640, 642, and 644 and transmits the three store/add operations 640, 642, and 644 to the remote high-speed hub 420(1). These store/add operations 640, 642, and 644 include a remote memory operation (store) that stores a data segment in the PP memory 204(1) and a synchronization operation (add) that updates a synchronization object in PP memory 204(1). The remote high-speed hub 420(1) divides each of the store/add operations 640, 642, and 644 into a store operation and an add operation. The remote high-speed hub 420(1) sequences these operations such that the store operation executes before the corresponding add operation. As each store operation completes, the PP memory 204(1) transmits acknowledgements (Ack) 650, 652, and 654 to the remote high-speed hub 420(1). The acknowledgements 650, 652, and 654 correspond to store/add operations 640, 642, and 644, respectively. Upon receiving the acknowledgements 650, 652, and 654, the remote high-speed hub 420(1) coalesces the update values included in the three add operations. The remote high-speed hub 420(1) generates a single atomic operation 680 to update the synchronization object based on all three store/add operations 640, 642, and 644.

Meanwhile, the remote SM 310(1) polls the flag to determine whether the three store/add operations 640, 642, and 644 have completed. The remote SM 310(1) generates a poll 660 and transmits the poll 660 to the remote PP memory 204(1). At the time that the remote PP memory 204(1) receives the poll 660, the three store/add operations 640, 642, and 644 have not yet completed. Therefore, the remote PP memory 204(1) returns a status 662 indicating that the data is not yet available for loading. The remote SM 310(1) generates another poll 664 and transmits the poll 664 to the remote PP memory 204(1). At the time that the remote PP memory 204(1) receives the poll 664, the three store operations 640, 642, and 644 have completed and the remote PP memory 204(1) has received and processed the atomic operation 680 that updates the synchronization object. Therefore, the remote PP memory 204(1) returns a status 666 indicating that the data is available for loading. In response, the remote SM 310(1) performs three data load operations 690, 692, and 694 to load the data stored by the three store/add operations 640, 642, and 644, respectively.

With self-synchronizing remote memory operations, the SM 310(0) does not generate a separate memory synchronization operation. Instead, the SM 310(0) the synchronization operations within the self-synchronizing remote memory operations. Therefore, three transactions between the source SM 310(0) and the remote SM 310(1) over the interconnect 430 are avoided. Further, due to coalescing, the three acknowledgements 650, 652, and 654 coalesce, and the remote high-speed hub 420(1) generates a single atomic operation 680 to update the synchronization object for all three store/add operations 640, 642, and 644.

Figure 7:
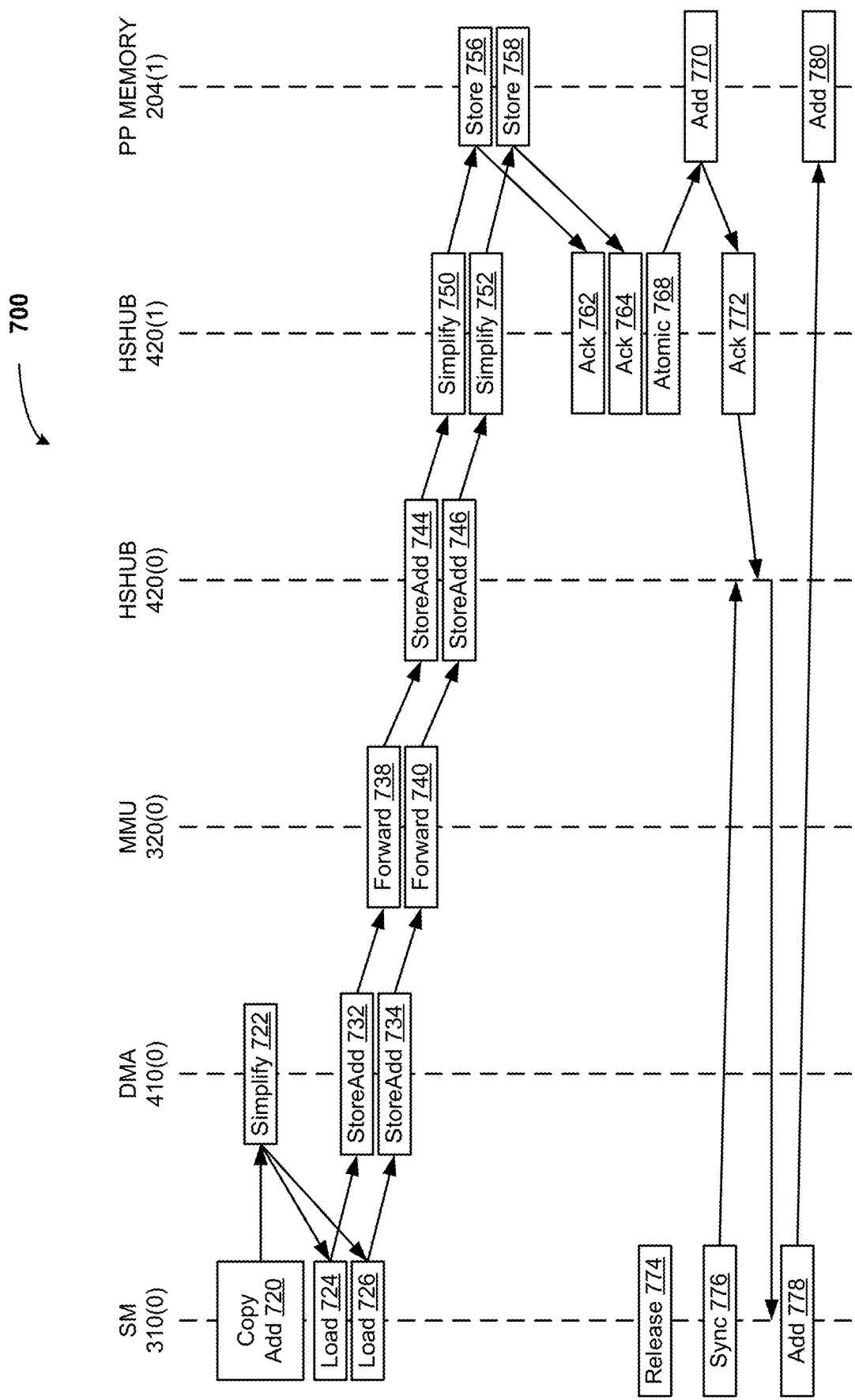
FIG. 7 is a more detailed sequence diagram of self-synchronizing remote memory operations performed by the accelerator processing subsystems of FIG. 4, according to various embodiments.

FIG. 7 is a more detailed sequence diagram 700 of self-synchronizing remote memory operations performed by the accelerator processing subsystems 112 of FIG. 4, according to various embodiments. As shown, the SM 310(0) generates a copy/add operation 720 and transmits the copy/add operation 720 to the DMA controller 410(0). The copy/add operation 720 includes configuration data for the DMA controller 410(0) that specifies the parameters for a copy operation and corresponding synchronization (add) operations. The DMA controller 410(0) performs a simplify operation 722 to divide the copy/add operation 720 into multiple load operations 724 and 726 that load a corresponding data segment from local memory of the SM 310(0). The SM 310(0) transmits the data from the load operations 724 and 726 to the DMA controller 410(0). The DMA controller 410(0) generates multiple store/add operations 732 and 734, that include the data from the load operations 724 and 726, respectively. The DMA controller 410(0) transmits the store/add operations 732 and 734 to the MMU 320(0). The MMU 320(0) performs one or more virtual address translations for the store/add operation 732. The MMU 320(0) performs a forward operation 738 to transmit the store/add operation 732 with translated memory addresses to the local high-speed hub 420(0) as store/add operation 744. Likewise, the MMU 320(0) performs a forward operation 740 to transmit the store/add operation 734 with translated memory addresses to the local high-speed hub 420(0) as store/add operation 746. The local high-speed hub 420(0) transmits the store/add operations 744 and 746 to the remote high-speed hub 420(1).

The remote high-speed hub 420(1) performs a simplify operation 750 on the store/add operation 744 to divide the store/add operation 744 into a store operation 756 and an add operation. The remote high-speed hub 420(1) sequences these operations such that the store operation executes before the corresponding add operation. Likewise, the remote high-speed hub 420(1) performs a simplify operation 752 on the store/add operation 746 to divide the store/add operation 746 into a store operation 758 and an add operation. The remote high-speed hub 420(1) sequences these operations such that the store operation executes before the corresponding add operation.

When the store operation 756 completes, the remote PP memory 204(1) generates an acknowledgement (Ack) 762 and transmits the acknowledgement 762 to the remote high-speed hub 420(1). Likewise, when the store operation 758 completes, the remote PP memory 204(1) generates an acknowledgement 764 and transmits the acknowledgement 764 to the remote high-speed hub 420(1). The acknowledgements 762 and 764 correspond to store/add operations 744 and 746, respectively. Upon receiving the acknowledgements 762 and 764, the remote high-speed hub 420(1) coalesces the update values included in the two add operations. The remote high-speed hub 420(1) generates a single atomic operation 768 to update the synchronization object based on the two store/add operations 744 and 746. The remote PP memory 204(1) performs and atomic add operation 770 to update the synchronization object and notifies the remote high-speed hub 420(1). The remote high-speed hub 420(1) generates an acknowledgement 772 and transmits the acknowledgement 772 to the SM 310(0).

Meanwhile, after generating the copy/add operation 720, the SM 310(0) generates a release 774 to indicate that the copy/add operation 720 is in progress. The SM 310(0) generates a memory synchronization operation (sync) 776 to cover cases where one or more of the store/add operations 732 and 734 are demoted. In this case, none of the store/add operations 732 and 734 was demoted to a non-self synchronizing memory store operation. Therefore, the memory synchronization operation 776 quickly resolves. The SM 310(0) performs an add operation 778 that correspondingly causes the remote PP memory 204(1) to perform an add operation 780 to set a flag indicating that the copy/add operation 720 has completed.

Figure 8:
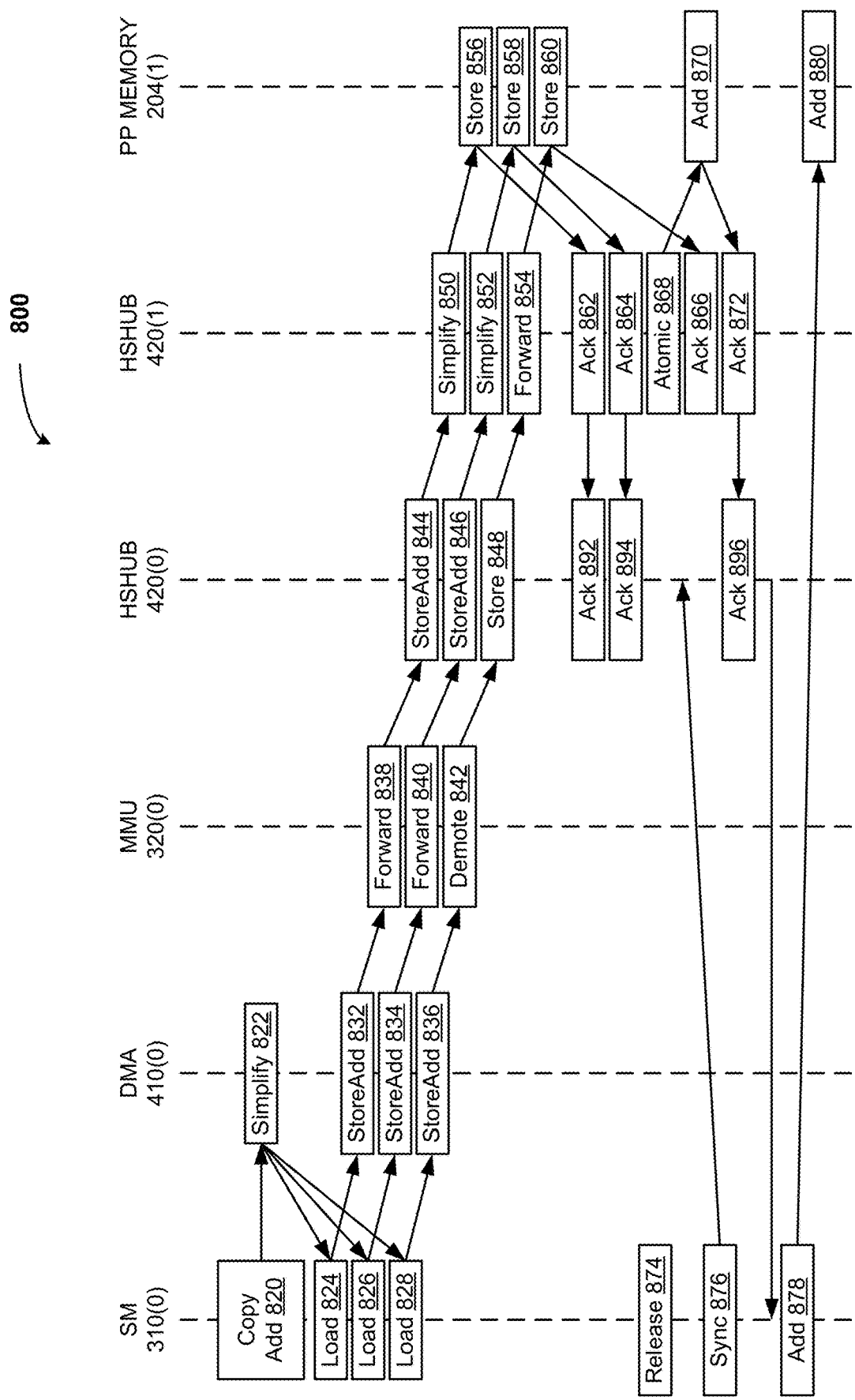
FIG. 8 is a more detailed sequence diagram of self-synchronizing remote memory operations including a demoted remote memory operation performed by the accelerator processing subsystems of FIG. 4, according to various embodiments.

FIG. 8 is a more detailed sequence diagram 800 of self-synchronizing remote memory operations including a demoted remote memory operation performed by the accelerator processing subsystems 112 of FIG. 4, according to various embodiments. As shown, the SM 310(0) generates a copy/add operation 820 and transmits the copy/add operation 820 to the DMA controller 410(0). The copy/add operation 820 includes configuration data for the DMA controller 410(0) that specifies the parameters for a copy operation and corresponding synchronization (add) operations. The DMA controller 410(0) performs a simplify operation 822 to divide the copy/add operation 820 into multiple load operations 824, 826, and 828 that load a corresponding data segment from local memory of the SM 310(0). The SM 310(0) transmits the data from the load operations 824, 826, and 828 to the DMA controller 410(0). The DMA controller 410(0) generates multiple store/add operations 832, 834, and 836, that include the data from the load operations 824, 826, and 828, respectively. The DMA controller 410(0) transmits the store/add operations 832, 834, and 836 to the MMU 320(0). The MMU 320(0) performs one or more virtual address translations for the store/add operation 832. The MMU 320(0) performs a forward operation 838 to transmit the store/add operation 832 with translated memory addresses to the local high-speed hub 420(0) as store/add operation 844. Likewise, the MMU 320(0) performs a forward operation 840 to transmit the store/add operation 834 with translated memory addresses to the local high-speed hub 420(0) as store/add operation 846. The local high-speed hub 420(0) transmits the store/add operations 844 and 846 to the remote high-speed hub 420(1).

However, the MMU 320(0) performs a demote operation 842 on the store/add operation 836, such as for one of the reasons described herein. For example, the MMU 320(0) can determine that the remote memory operation (store) of the store/add operation 836 is directed toward a different virtual address page than the synchronization operation (add) of the store/add operation 836. If the MMU 320(0) is configured to perform one virtual address translation per memory operation, then the MMU 320(0) performs the demote operation 842. The local high-speed hub 420(0) transmits the demoted store operation 848 to the remote high-speed hub 420(1).

The remote high-speed hub 420(1) performs a simplify operation 850 on the store/add operation 844 to divide the store/add operation 844 into a store operation 856 and an add operation. The remote high-speed hub 420(1) sequences these operations such that the store operation executes before the corresponding add operation. Likewise, the remote high-speed hub 420(1) performs a simplify operation 852 on the store/add operation 846 to divide the store/add operation 846 into a store operation 858 and an add operation. The remote high-speed hub 420(1) sequences these operations such that the store operation executes before the corresponding add operation. Because the store/add operation 836 has been demoted to a non-self synchronizing memory store operation 848, the remote high-speed hub 420(1) does not need to divide the operation. Instead, the remote high-speed hub 420(1) performs a forward operation 854 to forward the store operation 848 to the remote PP memory 204(1) as store operation 860.

When the store operation 856 completes, the remote PP memory 204(1) generates an acknowledgement (Ack) 862 and transmits the acknowledgement 862 to the remote high-speed hub 420(1). Likewise, when the store operation 858 completes, the remote PP memory 204(1) generates an acknowledgement 864 and transmits the acknowledgement 864 to the remote high-speed hub 420(1). The acknowledgements 862 and 864 correspond to store/add operations 844 and 846, respectively. Upon receiving the acknowledgements 862 and 864, the remote high-speed hub 420(1) coalesces the update values included in the two add operations. The remote high-speed hub 420(1) generates a single atomic operation 868 to update the synchronization object based on the two store/add operations 844 and 846. The remote PP memory 204(1) performs and atomic add operation 870 to update the synchronization object and notifies the remote high-speed hub 420(1). The remote high-speed hub 420(1) generates an atomic acknowledgement 872 and transmits the atomic acknowledgement 872 to the SM 310(0). When the demoted store operation 860 completes, the remote PP memory 204(1) transmits an acknowledgement 866 to the remote high-speed hub 420(1). The remote high-speed hub 420(1) waits for the atomic acknowledgement 872 to arrive. When the atomic acknowledgement 872 arrives at the remote high-speed hub 420(1), the remote high-speed hub 420(1) transmits the acknowledgements 862 and 864, as acknowledgements 892 and 894, respectively, to the local high-speed hub 420(0), Additionally and concurrently, the remote high-speed hub 420(1) transmits the atomic acknowledgement 872, as acknowledgement 896, to the local high-speed hub 420(0).

Meanwhile, after generating the copy/add operation 820, the SM 310(0) generates a release 874 to indicate that the copy/add operation 820 is in progress. The SM 310(0) generates a memory synchronization operation (sync) 876 to cover cases where one or more of the store/add operations 832, 834, and 836 are demoted. In this case, the store/add operations 836 was demoted. Therefore, the memory synchronization operation 876 resolves when the SM 310(0) receives the corresponding acknowledgement 866. In response, the SM 310(0) performs an add operation 878 that correspondingly causes the remote PP memory 204(1) to perform an add operation 880 to set a flag indicating that the copy/add operation 820 has completed, including the store/add operations 832 and 834, as well as the demoted store operation 860.

In some embodiments, the requesting SM 310(0) performs the barrier repair in hardware rather than in software. Such embodiments are implemented as described in conjunction with FIG. 8, except that a request demoted by MMU 320(0), such as demote operation 842, is NACKed back to the source SM 310(0). The SM 310(0) maintains a record of all forwarded and then demoted requests associated with a copy/add operation 820. When all of the associated acknowledgements (ACKs), that is, forwarded requests and NACKs, that is, demoted requests, return, the SM 310(0) accumulates the NACKs into a single barrier update in order to repair the barrier. The SM 310(0) causes the barrier to reach the expected count. The SM 310(0) repairs the barrier by performing the release 874, synchronization operation 876, add operation 878 sequence in hardware. By performing this barrier repair in hardware, a single barrier is sufficient, in that add operation 870 and add operation 880 are to the same barrier, thereby simplifying this approach with respect to the software implementation. Whether or not any demotion happened in MMU 320(0), the barrier always reaches the expected count. If no demotion occurs, the latency of the operation is reduced, similar to the software-based repair approach. If a demotion occurs, the latency of the operation is comparable to the software-based repair approach.

Figure 9:
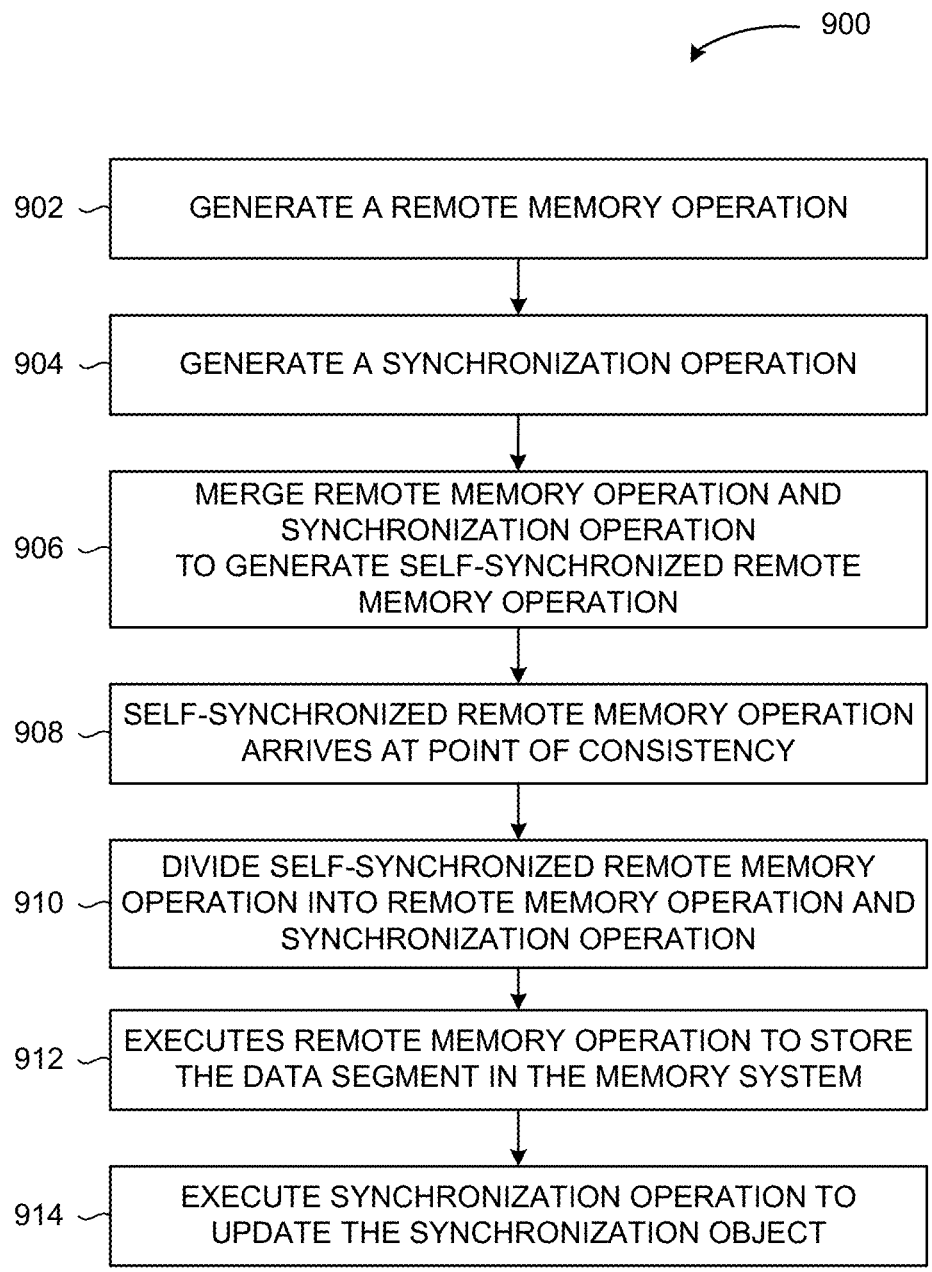
FIG. 9 is a flow diagram of method steps for performing remote memory operations with the accelerator processing subsystems of FIG. 4, according to various embodiments.

FIG. 9 is a flow diagram of method steps for performing remote memory operations with the accelerator processing subsystems 112 of FIG. 4, according to various embodiments. Additionally or alternatively, the method steps can be performed by one or more alternative accelerators including, without limitation, CPUs, GPUs, DMA units, IPUs, NPUs, TPUs, NNPs, DPUs, VPUs, ASICs, FPGAs, and/or the like, in any combination. Although the method steps are described in conjunction with the systems of FIGS. 1-8, persons of ordinary skill in the art will understand that any system configured to perform the method steps, in any order, is within the scope of the present disclosure.

As shown, a method 900 begins at step 902, where a processing unit included in a first accelerator processing subsystem 112(0) generates a remote memory operation directed towards a memory system included in a second accelerator processing subsystem 112(1). The remote memory operation can be a single, isolated memory operation generated by the processing unit. Alternatively, the remote memory operation one of a set of multiple remote memory operations to transfer a block of data, where each memory store operation transfers a data segment included in the bock of data.

At step 904, the processing unit generates a synchronization operation that includes metadata identifying a synchronization object associated with the remote memory operation and a particular memory location where the synchronization object is stored. If a single remote memory operation is being synchronized, the synchronization object can be a binary flag. The binary flag can be cleared prior to the remote memory operation. After the remote memory operation executes, the synchronization operation sets the binary flag.

If multiple remote memory operations are being synchronized, the synchronization object can be a count of the number of bytes being transferred by the multiple remote memory operations. Prior to executing the multiple remote memory operations, the remote SM 310(1) determines the value of the count currently stored in the synchronization object. The remote SM 310(1) adds the number of bytes expected from the multiple remote memory operations to the current count to determine a target count. When the remote SM 310(1) determines that the count stored in the synchronization object is equal to the target count, then the multiple remote memory operations have executed.

Additionally or alternatively, if multiple remote memory operations are being synchronized, the synchronization object can be a count of the number of data segments being transferred by the multiple remote memory operations. Typically, one data segment is transferred for each remote memory operation. Prior to executing the multiple remote memory operations, the remote SM 310(1) determines the value of the count currently stored in the synchronization object. The remote SM 310(1) adds the number of data segments expected from the multiple remote memory operations to the current count to determine a target count. When the remote SM 310(1) determines that the count stored in the synchronization object is equal to the target count, then the multiple remote memory operations have executed.

At step 906, the processing unit merges the remote memory operation generated in step 902 and the synchronization operation generated in step 904 to generate a self-synchronizing remote memory operation. The processing unit transmits the self-synchronizing remote memory operation to the second accelerator processing subsystem 112(1) as described herein. The self-synchronizing remote memory operation remains as a merged remote memory operation and synchronization operation until the self-synchronizing remote memory operation reaches a point of consistency.

At step 908, the self-synchronizing remote memory operation arrives at the point of consistency. The point of consistency can be at any component included in the second accelerator processing subsystem 112(1) that directs the remote memory operation towards one set of memory locations and the synchronization operation towards a different set of memory locations. In one example, the point of consistency can be a remote high-speed hub 420(1) included in the second accelerator processing subsystem 112(1).

At step 910, at the point of consistency, the component, such as the remote high-speed hub 420(1), divides the self-synchronizing remote memory operation into two operations: (1) the remote memory operation that stores the data segment; and (2) the synchronization operation that updates the synchronization object. The component orders the two operations such that the remote memory operation executes prior to the synchronization operation.

At step 912, the remote memory operation executes, storing the data segment in the memory system included in the second accelerator processing subsystem 112(1). Because of the ordering imposed in step 910, the remote memory operation executes prior to the synchronization operation.

At step 914, the synchronization operation executes to update the synchronization object. If the synchronization object is a binary flag, then the synchronization operation sets the binary flag. If the synchronization object is a count of the number of bytes being transferred by the multiple remote memory operations, then the synchronization operation adds the number of bytes transferred by the remote memory operation executed in step 912 to the value stored in the synchronization object. If the synchronization object is the count of the number of data segments being transferred by the multiple remote memory operations, then the synchronization operation increments the value stored in the synchronization object.

The method 900 then terminates. Alternatively, the method 900 proceeds to step 902, described above, to process additional remote memory operations.

In sum, processing units in a multiprocessor system perform self-synchronizing remote memory operations, where remote memory operations include the associated metadata that identifies the memory location of the corresponding synchronization object. The remote memory operation along with the metadata is transmitted as a single unit until a point relatively close to the destination, at which point the remote memory operation and the memory synchronization operation diverge. This point is referred to as the point of consistency. At the point of consistency, the remote memory operation and the memory synchronization operation is split into two operations. The memory synchronization operation, which updates the synchronization object, is ordered behind the execution of the remote memory operation. This approach facilitates fine-grained synchronization of remote memory operations with low network latency and network bandwidth overhead. This approach further facilitates coalescing of multiple updates to the same synchronization object across multiple remote memory operations that are temporally collocated. Coalescing of multiple remote memory operations further reduces the overhead of the fine-grained synchronization.

At least one technical advantage of the disclosed techniques relative to the prior art is that, with the disclosed techniques, memory synchronization operations are resolved closer to the destination processing unit, thereby reducing the number of operations performed over the interconnect between processors. As a result, operating performance is increased relative to prior approaches. Another advantage of the disclosed techniques is that the disclosed techniques do not require an expensive and complex network data processor to perform remote memory operations. Instead, the disclosed techniques leverage existing memory operation types and do not rely on any explicit ordering of memory operations, leading to higher efficiency and performance for remote memory operations. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing remote memory operations, the method comprising:
   determining that a first self-synchronizing memory store operation has arrived at a point of consistency in a computing system, wherein the first self-synchronizing memory store operation includes a first memory store operation and a first synchronization operation;
   dividing, at the point of consistency, the first self-synchronizing memory store operation into the first memory store operation and the first synchronization operation; and
   upon completion of the first memory store operation, updating a value stored in a first synchronization object based on the first synchronization operation.

2. The computer-implemented method of claim 1, wherein the first synchronization object comprises a binary flag, and wherein updating the first synchronization object comprises setting the binary flag.

3. The computer-implemented method of claim 1, wherein the first synchronization object comprises a count of the remote memory operations, and wherein updating the first synchronization object comprises incrementing the count.

4. The computer-implemented method of claim 1, wherein the first synchronization object comprises a count of a number of bytes transferred by the remote memory operations, and wherein updating the first synchronization object comprises adding a number of bytes included in the first memory store operation to the count.

5. The computer-implemented method of claim 4, further comprising:
   determining that a second self-synchronizing memory store operation has been demoted to a non-self-synchronizing memory store operation; and
   adding a number of bytes included in the non-self-synchronizing memory store operation to the count.

6. The computer-implemented method of claim 1, further comprising:
   generating a second self-synchronizing memory store operation that includes a second memory store operation and a second synchronization operation that includes metadata associated with a third location of a second synchronization object stored in a memory system;
   transmitting the second self-synchronizing memory store operation to the memory system;
   determining the second synchronization operation cannot be processed;
   demoting the second self-synchronizing memory store operation to the second memory store operation; and
   storing data included in the second memory store operation at the third location in the memory system.

7. The computer-implemented method of claim 6, wherein determining that the second synchronization operation cannot be processed comprises:
   determining that the third location in the memory system resides in a first virtual memory page; and
   determining that the second synchronization object resides in a second virtual memory page.

8. The computer-implemented method of claim 1, further comprising:
   determining that a second self-synchronizing memory store operation has arrived at the point of consistency in the computing system; and
   determining that the first synchronization operation can be merged with a second synchronization operation included in the second self-synchronizing memory store operation,
   wherein the first synchronization object is updated based on the first synchronization operation and the second synchronization operation.

9. The computer-implemented method of claim 8, wherein determining that the first synchronization operation can be merged with the second synchronization operation comprises determining that the first synchronization operation and the second synchronization operation arrived at the point of consistency within a threshold duration of time of one another.

10. The computer-implemented method of claim 8, wherein determining that the first synchronization operation can be merged with the second synchronization operation comprises determining that the second synchronization operation arrived at the point of consistency while the first synchronization operation was pending.

11. The computer-implemented method of claim 8, wherein determining that the first synchronization operation can be merged with the second synchronization operation comprises determining, based on metadata included in the first synchronization operation, that the second self-synchronizing memory store operation is forthcoming.

12. The computer-implemented method of claim 1, wherein the point of consistency is located at a hub in the computing system.

13. The computer-implemented method of claim 1, wherein the first self-synchronizing memory store operation is received from a first processor that:
   generates the first self-synchronizing memory store operation that includes the first memory store operation and the first synchronization operation; and
   transmits the first self-synchronizing memory store operation to a memory system.

14. The computer-implemented method of claim 1, further comprising:
   storing data included in the first memory store operation at a first location in a memory system.

15. The computer-implemented method of claim 1, further comprising:
   transmitting data included in the first memory store operation to a first processor,
   wherein the first processor stores the data included in the first memory store operation at a first location in a memory system.

16. A system comprising:
   a first processor that:
      generates a first self-synchronizing memory store operation that includes a first memory store operation and a first synchronization operation, and
      transmits the first self-synchronizing memory store operation to a memory system associated with a second processor; and
   the second processor that:
      determining that a first self-synchronizing memory store operation has arrived at a point of consistency in the system, wherein the first self-synchronizing memory store operation includes a first memory store operation and a first synchronization operation;

dividing, at the point of consistency, the first self-synchronizing memory store operation into the first memory store operation and the first synchronization operation; and upon completion of the first memory store operation, updating a value stored in a first synchronization object based on the first synchronization operation.

17. The system of claim 16, wherein the system further includes a third processor that:

generates a second self-synchronizing memory store operation that includes a second memory store operation and a second synchronization operation that includes metadata associated with a third location of a second synchronization object stored in the memory system, wherein the first memory store operation and the second memory store operation correspond to a first data transfer, and transmits the second self-synchronizing memory store operation to the memory system associated with the second processor;

wherein the second processor further:

determines that the second self-synchronizing memory store operation has arrived at the point of consistency in the system, divides, at the point of consistency, the second self-synchronizing memory store operation into the second memory store operation and the second synchronization operation, stores data included in the second memory store operation at the third location in the memory system, and updates the first synchronization object.

18. The system of claim 16, wherein the system further includes a third processor and a fourth processor:

wherein the third processor:

determines that the first synchronization object has reached a target value; and in response, reads data stored during execution of the first memory store operation, and wherein the fourth processor:

determines that the first synchronization object has reached the target value; and in response, reads the data stored during execution of the first memory store operation.

19. The system of claim 16, wherein the first synchronization object comprises a binary flag, and wherein, to update the first synchronization object, the second processor sets the binary flag.

20. The system of claim 16, wherein the first synchronization object comprises a count of remote memory operations, and wherein, to update the first synchronization object, the second processor increments the count.

* * * * *